July 9, 1968
H. F. SHERWOOD
3,392,281
METHOD AND APPARATUS FOR CONDITIONING AN X-RAY FILM PACK
FOR EXPOSURE BY EVACUATING SAID FILM PACK
Filed Oct. 13, 1964
2 Sheets-Sheet 1
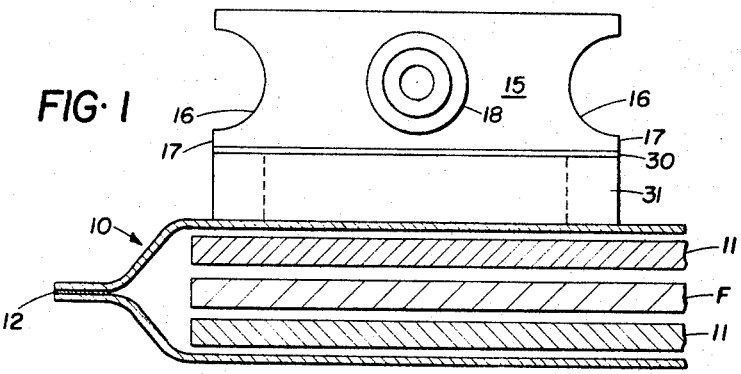
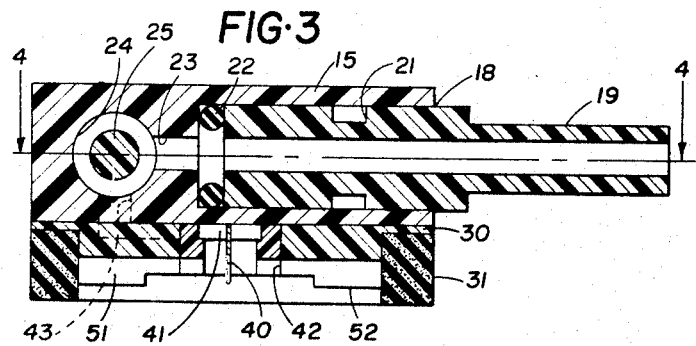
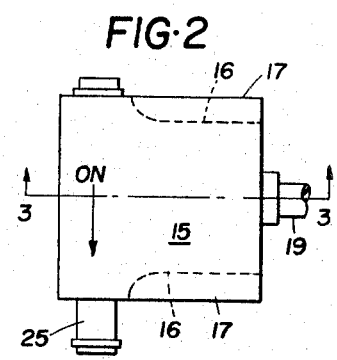
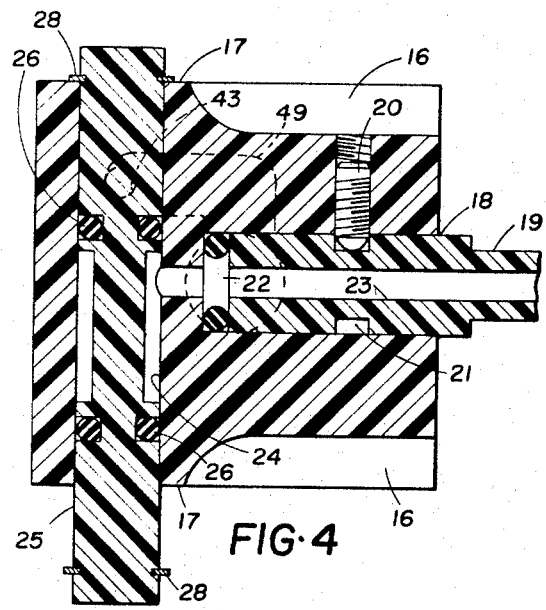
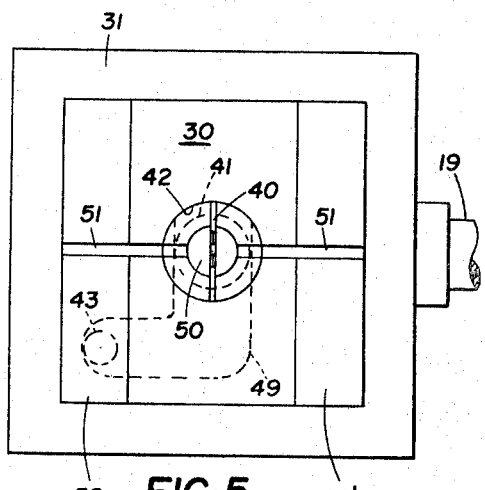
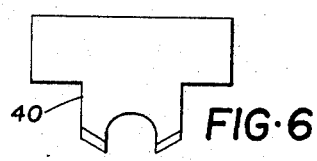
HAROLD F. SHERWOOD
INVENTOR.
BY *R. Frank Smith*
*[signature]*
ATTORNEYS

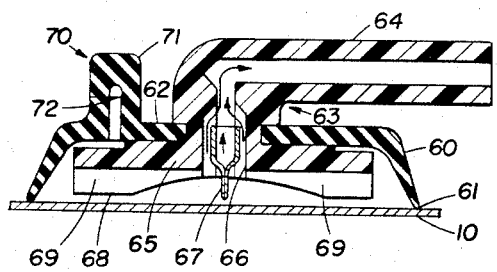
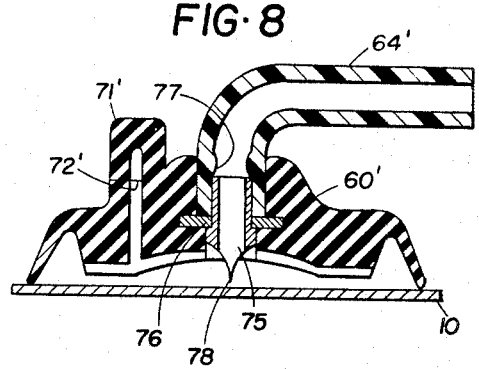
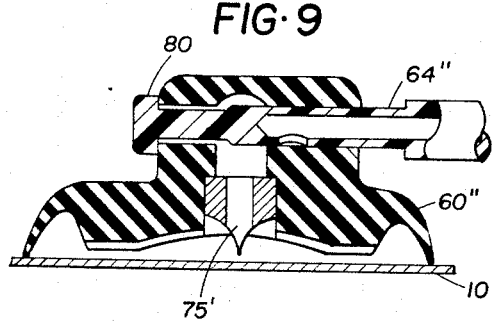
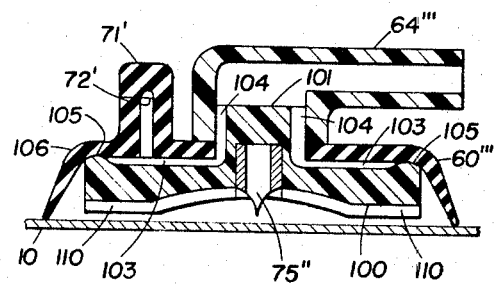
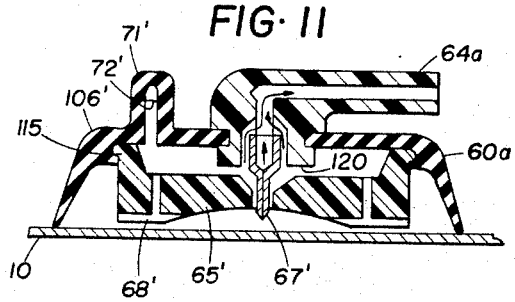

United States Patent Office 3,392,281
Patented July 9, 1968

3,392,281
METHOD AND APPARATUS FOR CONDITIONING AN X-RAY FILM PACK FOR EXPOSURE BY EVACUATING SAID FILM PACK
Harold F. Sherwood, Rochester, N.Y., assignor to Eastman Kodak Company, Rochester, N.Y., a corporation of New Jersey
Filed Oct. 13, 1964, Ser. No. 403,572
6 Claims. (Cl. 250—68)

ABSTRACT OF THE DISCLOSURE

A method and apparatus for evacuating a commercially available film pack to produce intimate contact between the film and intensifying screen(s) during exposure of the film. After a portion of the wall of the pack is isolated from the ambient atmosphere, which is perforated and then a vacuum is applied to said isolated portion to evacuate the interior of the film pack.

---

The present invention relates to radiography, and particularly to a method and apparatus for conditioning for exposure an X-ray film pack comprising a sheet of sensitive film and one or more sheets of material (intensifying screens) enclosed in face-to-face relation within a substantially air-tight, flexible envelope which is opaque to actinic light.

When X-rays or gamma rays are used to expose a radiographic film, a very small percentage of the energy is absorbed; in common applications often less than one (1) percent. Since the formation of the latent radiographic image is primarily governed by the energy that is absorbed, often more than 99% of the available energy is wasted. Therefore, any means for more fully utilizing this wasted energy, without unduly complicating the technical procedure, is desirable. To this end, two types of radiographic intensifying screens are commonly used: heavy element screens, e.g., lead foil, lead oxide coatings on a suitable support, and fluorescent phosphor coatings, e.g., $CaWO_4$, a coprecipitate of $BaSO_4$ and $PbSO_4$ with a formula $(BaSO_4)_x$, $(PbSO_4)_y$, ZnS, etc. on a suitable support.

Metal screens, such as lead foil or lead oxide, are commonly used in direct contact with the film to increase the photographic action of the radiation on the film and improve the quality of the radiographic image largely by reason of the electrons emitted from the screen(s), and partly by the secondary X-radiation generated. The intensification under certain conditions using lead foil can reach a factor of about three (3) times. Normally fluorescent screens are used with film having high blue light sensitivity. The intensification factor of commonly used phosphor screens varies from 15 to 30 times depending upon the kilovoltage and phosphors used.

Various types of film packs or cassettes have been proposed for use in the art of making radiographs to hold the sheets of sensitive film and the intensifying screens in face-to-face relation and protect them from actinic light and moisture. While various types of film packs or cassettes have been designed for this purpose, the one which the present invention is primarily concerned with comprises a flexible envelope within which the sensitive film and one or more intensifying screens are maintained in face-to-face relation. As is well-known, this envelope is made from a material which is opaque to actinic light and is hermetically sealed in any suitable manner, e.g., heat sealing, pressure sensitive adhesives, etc. to make the package substantially airtight.

If at the time of exposure the screen or screens do not make perfect contact with the film, some of the radiation emitted by the screen can spread before reaching the film, giving a somewhat blurred image. Thus, good contact between the film and screens within the film pack or cassette at the time of exposure is essential for the best image quality. However, attaining such intimate face-to-face contact under all circumstances of exposure has been a problem since the beginning of radiography, and is particularly troublesome where the film pack is caused to assume a shape other than flat by reason of the shape of the article which is being X-rayed, e.g., where a film pack is wrapped around a cylinder for X-raying a welded seam therein.

Mechanical methods of exerting the pressure required for screen-to-film contact, such as multiple latches, special padding, etc., have never been completely satisfactory. Conventional X-ray film cassettes have required superior mechanical action and rigidity in order to insure good contact, and the rigidity required therefor has resulted in considerable weight. The springs which have been attached to the cover of such cassettes are often too weak to provide adequate contact over the entire film area, especially where the X-ray film pack or cassette may be of rather large area as it is in some industrial applications.

With these requirements imposed on the design, certain known X-ray film cassettes have been necessarily heavy, and if accidentally dropped, often suffer damage that would impair the film-to-screen contact.

It is the primary object of the present invention to provide a method and apparatus for evacuating a commercially available X-ray film pack to produce intimate contact between the film and screen or screens and thus yield radiographs of better definition than are now achieved.

Another object of the present invention is to provide a method and apparatus for so conditioning an X-ray film pack for exposure which can be put into use at the time and place the film pack is to be exposed, and can be left in use during the exposure of the pack to insure the ultimate in film-to-screen contact at this time.

A further object is to provide a method and apparatus of the type described which will insure intimate film-to-screen contact regardless of the size (area) of the film pack.

Still another object is to provide an apparatus to be used with an X-ray film pack comprising a sheet of film and one or more screens contained in face-to-face relation within a hermetically sealed flexible envelope for evacuating air from said envelope and causing said film and screens to be forced into intimate face-to-face contact just prior to and during the exposure of the film pack.

A further object is to provide an apparatus of the type described for evacuating a film pack which comprises a cup-shaped member within which a vacuum can be created after the member is placed in contact with the wall of the film pack, and means within the cup for selectively perforating one wall of the film pack so that air can be evacuated from the pack to cause the film and screen(s) therein to be forced into face-to-face contact by the collapse of the walls in the envelope.

Another object is to provide an apparatus of the type set forth in which the film pack perforator is fixed to the cup-shaped member and is normally within the plane defined by the rim of the cup-shaped member and the wall of the envelope of the film pack is drawn against the perforator by the action of the vacuum.

Another object is to provide an apparatus of the type set forth in which the film pack perforator is fixed to the cup-shaped member and is normally retracted inwardly of the rim of said cup-shaped member by the inherent resilient character of a portion of said cup-shaped member which also allows said perforator to be moved to a film pack perforating position when pressure is manually applied to said cup-shaped member after its attachment to the wall of the film pack.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

FIG. 1 is an enlarged end view of a vacuum attachment block constructed in accordance with a preferred embodiment of the present invention and shown in operative position with relation to a conventional X-ray film pack to be evacuated thereby. The X-ray film pack is shown in section to illustrate what it consists of and how it is fabricated;

FIG. 2 is a top plane view of the vacuum attachment block shown in FIG. 1, and showing the same approximately to the scale it is made for commercial use;

FIG. 3 is an enlarged vertical sectional view of the device taken substantially on line 3—3 of FIG. 2;

FIG. 4 is a horizontal sectional view taken substantially on line 4—4 of FIG. 3;

FIG. 5 is a bottom plane view of the device;

FIG. 6 is an enlarged detail of one type of perforating blade which is used in the device;

FIGS. 7–11 are enlarged vertical sectional views showing other embodiments of the device for conditioning a film pack for exposure which are within the scope of the present invention.

According to the present invention, a radiographic film pack comprising a light-tight and sensibly air-tight, flexible envelope containing a sheet of sensitive film and at least one intensifying screen, e.g., lead foil, lead oxide coated papers, or fluorescent phosphor coatings, is evacuated by a device comprising a vacuum cup or block assembly containing a means for puncturing the paper envelope and to which a vacuum pump can be detachably connected to partially or totally evacuate the envelope so that atmospheric pressure on the outside of the envelope will press the intensifying screen (or screens) into intimate, uniform face-to-face contact with the film. The puncture or perforation made in the envelope is preferably quite small and located near an edge or corner of the film pack and penetrates only one wall of the envelope, not the screen or film therein, so that after the vacuum device is removed, the film is still protected from exposure to ambient light.

A conventional X-ray film pack for use with which the present invention is adapted is shown in FIG. 1 as comprising an envelope 10 made from an opaque flexible material, e.g., paper or plastic sheet, and within which a sheet of film F and one or two intensifying screens 11, on one or both sides, of the film are confined in face-to-face relation. After the film and screen(s) are placed in the envelope, the open edges thereof are sealed to make the envelope sensibly air-tight and to provide a hermetically sealed package for protecting the film and screen(s) from actinic light and moisture. The sealing of the envelope can be accomplished in any number of ways, e.g., the paper can have a heat-sensitive adhesive on the inside surface thereof which permits the edges to be heat sealed together after the film and screens are inserted into the envelope, the edges of the envelope can be bound with a pressure-sensitive tape, etc. In FIG. 1 I have shown the edges of the envelope joined by a heat seal designated at 12. When these film packs are made up, a certain amount of air is entrapped within the envelope and the film and screens are not held in intimate face-to-face contact uniformly through their entire area. This is particularly true in industrial X-ray film packs which are relatively large in size, e.g., 14 inches by 17 inches, 35 mm., 70 mm., and 3 to 5 inches wide and one or more feet in length. It will be appreciated that in film packs of these large dimensions the problem of obtaining intimate and uniform contact between the film and screens is not readily obtainable by the use of conventional techniques.

I have found that by puncturing a small hole in one wall of the paper envelope and attaching a vacuum pump, the paper envelope can be evacuated causing the envelope to collapse so that atmospheric pressure presses the screens firmly against the film, thus insuring intimate contact between the film and screens and furnishing maximum detail of the radiographic image. In order to simplify the evacuating procedure, according to the present invention, the punch for perforating the envelope and the vacuum cup for sealing the vacuum pump to the envelope are incorporated into a single unit of relatively small size so that it can be readily used at the time and place the film pack is to be exposed.

A preferred form of vacuum attachment block for conditioning a film pack of the type described for exposure is shown in FIGS. 2–6 as comprising a substantially rectangular block 15 made of a fairly rigid material, e.g., plastic, hard rubber, aluminum, etc. This block is fairly small and has finger grips 16 formed in opposite side walls 17 thereof to facilitate the operator grasping the same to accurately locate it on, or lift it from, the wall of the film pack. The block 15 is provided with a bore 18 within which a tubular vacuum connector 19 is rotatably mounted by a round-ended set screw 20 engaging a circumferential groove 21 therein. A rubber O-ring seal 22 is situated between the end of the connector 19 and the end of the bore 18 to provide an air-tight joint between these two parts. A small conduit 23 places the end of the bore 18 in communication with a transverse bore 24 in which a vacuum valve 25 is slideably mounted. O-ring seals 26 seal this valve within the bore 24 and stop flanges 28 engage the walls of the block 15 to limit the movement of the valve in its open and closed positions.

To the bottom of the block 15 there is fastened, in any suitable manner, a rigid bottom plate 30 the periphery of which is recessed to receive the resilient rubber seal 31 which is fastened to the bottom plate in any suitable manner, e.g., by gluing. This rubber seal extends below the bottom surface of plate 30 and in combination with the bottom surface of plate forms a cup-shaped member having a resilient rim which is adapted to engage the wall of the envelope of the film pack when the block is placed thereon, see FIG. 1. This resilient rim 31 must be air-tight so that if foam rubber is used for the same it must be of the closed cell type of foam rubber. A knife blade 40 of the shape as shown in FIG. 6 is fixed to a circular blade holder 41 which is in turn cemented or otherwise fastened in a recess 42 formed centrally of the bottom plate 30. The dimensions of the knife, knife holder 41 and recess 42 are such that when the block is off the envelope, or is not pressed into engagement therewith, the tips of the knife blade will lie above the plane defined by the bottom face 52 of a rigid plate 30 to be described. Accordingly, when the block is first placed on the wall of the film pack, the knife will not extend beyond the rim 31 to perforate the envelope. In a preferred mode of operation, after the device is properly located on the film pack and vacuum is applied to the same by opening vacuum valve 25, the wall of the envelope of the film pack is drawn upwardly against the knife 40 to be perforated thereby. It is the atmospheric pressure of the air entrained within the envelope during the fabrication thereof which supplies the force required to push the wall of the envelope against the knife to puncture the same. Alternatively, the perforator knife can extend slightly below the bottom surface 52, but above the plane defined by the rim of the cup-shaped member, as will be fully set forth below, so that by manually pressing down on the top of the device, the engaged wall of the envelope is perforated. This last mode of operation is preferred with film packs which might be partially evacuated at the time they are fabricated so that there is not sufficient entrained air therein to force the wall of the envelope against the perforator with sufficient force to cause perforation of the film pack when vacuum is applied to the device. Manual operation of the perforator might also be required in cases where the material from which the envelope of the film pack is made is tough and/or the perforator is dull, and in instances where the film pack is wrapped around a cylindrical surface and the wall of the envelope is put under such tension that the expansion of the air entrained therein is not sufficient to overcome this tension and force the envelope against the perforator with sufficient force to perforate the same. If such a mode of operation is used, the resilient rim 31 will be compressed sufficiently to allow the tips of the knife to perforate the wall of the envelope, and when manual pressure is removed from the block, the knife will be retracted by the inherent resilience of the rim 31 to leave the perforation open.

The interior of the cup-shaped member is placed in communication with the transverse bore 24 by a vertical hole 43 in block 15 which extends from bore 24 to the interface between the bottom of the block and the top surface of the bottom plate 30 and a right angle vacuum channel 49 formed in the top surface of plate 30 extending from the hole 43 to the hole 50 in the center of the knife holder. To allow a more rapid and complete evacuation of the cup-shaped member and the envelope engaged thereby, the bottom surface of plate 30 has a channel 51 formed therein to place the hole 50 in the knife holder in communication with parts of the cup-shaped member extending all the way to the rim portion 31.

With the vacuum connector 19 of the vacuum block connected to any suitable vacuum pump or aspirator, not shown and with the vacuum valve 25 slid to its closed position, the operator grasps the block 15 by the finger grips 16 and places the resilient rim 31 thereof in engagement with one corner of the film pack. After the device is properly located on the film pack, the vacuum valve 25 is opened and the vacuum immediately evacuates the cup-shaped member and firmly attaches the block to the surface of the film pack. At the same time the wall of the envelope is forced upwardly against the knife perforator by the atmospheric presure of the air entrained in the film pack to perforate the envelope whereupon the envelope is evacuated. The bottom face 52 of the plate 30 is so spaced relative to the tips of the knife 40 that when the wall of the envelope is forced upwardly against the perforator by the pressure of the air within the envelope the face 52 will limit the upward movement of the wall so that only one, and not both, walls of the envelope will be perforated. After evacuating the envelope it becomes quite stiff and will hold the approximate shape (curved or flat) which it has been forced to assume by reason of the shape of the article on which it has been placed before evacuation. Usually the perforation made in the envelope of the film pack by the knife is sufficiently small and self-sealing so that the contents of the film pack will not be light-struck after the block is removed. However, to be sure that the film pack will not be accidentally light-fogged before it is processed, a piece of opaque adhesive tape can be placed over the perforation just a soon as the block is removed from the film pack.

In FIG. 7 another embodiment of my vacuum attachment block is disclosed. This comprises a vacuum cup 60 made of a suitable elastomer material, e.g., rubber, the rim 61 of which is adapted to be placed in engagement with the wall of the film pack 10. Carried by the cross member 62 of the vacuum cup is a rigid member 63, preferably plastic as indicated, which includes a hollow vacuum connector 64 to which a vacuum pump, not shown, may be connected, and a rigid disk portion 65 within the cup-shaped member. In a bore 66 passing through the disk portion 65 to the hollow vacuum connector 64 there is fixed a hypodermic type needle 67 the end of which normally lies above the plane defined by the rim of the vacuum cup. After the vacuum cup is placed on the envelope of the film pack, manual pressure is applied to the top of the rigid member to deflect the cross member 62 of the cup and cause the needle 67 to perforate the envelope. The vacuum pump attached to the vacuum connector 64 immediately starts to evacuate the film pack, the air flow following the small arrows shown. The bottom surface 68 of the rigid disk 65 will engage the wall of the envelope of the film pack and serve to limit movement of the needle to an extent such that it cannot penetrate both walls of the film pack. The bottom wall of the disk 65 is provided with radially extending channels 69 to speed up evacuation of the vacuum cup. The device is provided with a vacuum release generally indicated at 70 and which consists of a hollow bell portion 71 the interior of which is in communication with the inside of the vacuum cup and the wall of which is provided with a slit 72. The application of vacuum to the cup-shaped member will tend to hold this slit closed, but if lateral pressure is manually applied to the top portion of this bell portion, the slit can be opened by deforming the resilient material from which it is made and the vacuum seal will be broken so that the device can be lifted from the evacuated film pack. While in this embodiment as described it has been assumed that manual pressure must be applied to the device to perforate the envelope, this is based on the assumption that film pack when made might be partially evacuated or conditions might exist which would prevent expansion of air within the film pack to cause its perforation. If the film packs used do have sufficient air entrained therein so that the pressure thereof will serve to force the wall of the envelope against the knife with sufficient force to perforate it, then the preferred mode of operation can be pursued in which case the tip of the needle 67 will be slightly above the bottom surface 68 of disk 65 and no downward pressure on the device will be needed to perforate the film pack.

The embodiment shown in FIG. 8 differs from that shown in FIG. 7 primarily in that the entire device is made of an elastomer material, except possibly the vacuum connector 64′, and the perforator is in the form of a tubular member 75 fixed against axial movement relative to the vacuum cup 60′ by a rigid washer 76 imbedded in the cup member and a constriction 77 in the vacuum connector. The extreme end of the tubular member 75 terminates in a point or points 78 which will perforate the envelope of the film pack when downward pressure is manually applied externally to the center of the vacuum cup by pressing on the vacuum connector 64′. As pointed out above, if the film pack has sufficient air entrained therein then there may be no need to press down on the device but when the cup is evacuated the entrained air in the pack will expand and force the envelope up against the points 78 to perforate it.

The FIG. 9 embodiment differs from the FIGS. 7 and 8 embodiments primarily in that the vacuum connector 64″ is slideably connected to the vacuum cup 60″ and constitutes a slide valve 80 by means of which the vacuum cup can be selectively connected to the source of vacuum and/or sealed off therefrom after the film pack has been evacuated. The vacuum seal can be broken by sliding the valve to its open position with the source of vacuum removed. In this embodiment the tubular perforator 75′ is cemented or otherwise fastened in a recess in the cross member of the vacuum cup.

The FIG. 10 embodiment is designed to provide an automatic valve for connecting the source of vacuum to the vacuum cup. The vacuum cup 60‴ is made of an elastomer material and the vacuum connector 64‴ and knife carrying member 100 are made of a rigid material, e.g., plastic, as indicated. The knife carrying member 100 has a circular boss portion 101 which extends up into the end of the vacuum connector and this boss portion 101, the end of the connector and that portion of the vacuum cup abutting the end of the connector are sealed together by a suitable adhesive. The top of the knife carrier is provided with a plurality of radially extending channels 103 which connect with a like number of openings 104 spaced circumferentially of the boss portion 101 whereby these channels are placed in communication with a vacuum connector. The extreme outer edge of the knife carrier terminates in a raised, rounded ridge 105 which engages the underside of the vacuum cup adjacent the bend 106 therein to normally seal off the inside of the cup except for the vacuum release seal consisting of a bell portion 71' having a slit 72' in the wall thereof. The perforating knife 75" is fixed to and extends from the bottom of the carrier 100 which has radial channels 110 formed in the bottom thereof. In use, this device is placed on the envelope 10 of the film pack with the rim of the cup engaging the wall of the envelope. When the vacuum connector is connected to a source of vacuum, air is evacuated from above the knife carrier and from the bell portion 71' to hold the knife carrier against the top of the vacuum cup and to close the vacuum sealing slit 72'. Now if downward manual pressure is applied to the vacuum connector 64''' at the center of the vacuum cup, the knife carrier 100 is moved downwardly until the bottom surface thereof engages the film pack. This movement may cause the knife to move beyond the rim of the vacuum cup by an amount sufficient to perforate the wall of the film pack engaged by the cup but not sufficient to perforate the opposite wall of the film pack, or it may move the knife just short of the wall of the envelope. At this time the raised ridge 105 of the knife carrier moves away from the underside of the vacuum cup to place the channels 103 thereof in communication with the vacuum cup proper so that the film pack will be evacuated. The raised ridge and the knife carrier will tend to move away from the underside of the vacuum cup and keep the vacuum passages 103 and 104 open because the bend 106 in the cup will give this portion of the cup sufficient rigidity to resist collapse under the effect of the vacuum within the cup. After the knife carrier is once depressed, it will be retained in this position by the vacuum created in the cup and the atmospheric pressure acting on the vacuum connector from outside of the cup. In the preferred form the knife will have stopped just short of the envelope wall and vacuum applied to the cup will cause the air in the envelope to force the wall against the knife to perforate the same, or the downward pressure on the device has caused the knife to perforate the envelope if the tip of the knife extends sufficiently below the carrier 100. To break this vacuum seal after the vacuum is cut off from connector 64''', it is only necessary to press laterally on the bell portion 71' to open the slit 72'.

The FIG. 11 embodiment differs from the other embodiments disclosed, and particularly the FIG. 7 embodiment, in that the rigid disk portion 65' is not physically connected to the vacuum connector 64a and the perforating needle 67' to move therewith for perforating the envelope 10. On the contrary, the rigid disk portion 65', the function of which is to limit the extent to which the needle can move in perforating the film pack, is fastened to the inside of the vacuum cup 60a by having a flange 115 thereon molded into the cup member adjacent the bend 106'. The vacuum connector 64a and perforator 67' are connected to the cross member of the vacuum cup so that they can be moved downwardly relative to the cup and disk portion 65' as downward manual pressure is applied to the top of the vacuum connector because of the resilience of the material from which the cup is made. The vacuum connector and perforator will move downwardly relative to disk portion 65' until the bottom edge 120 of the vacuum connector reaches the top surface of the disk portion 65' after which further downward movement of the perforator will carry disk portion 65' along with it. When the bottom surface 68' of the disk portion 65' engages the film pack 10, the downward movement of the perforator will be stopped so that it cannot perforate both sides of the film pack.

While I have shown and described certain specific embodiments of my invention I am aware that other modifications thereof are possible. My invention, therefore, is not to be limited to the specific structural details shown and described, but is intended to cover all modifications coming within the scope of the appended claims.

I claim:
1. The method of conditioning for exposure a film pack having a sheet of sensitive film and an intensifying screen enclosed in face-to-face relation within a substantially air-tight flexible envelope having air entrained therein, which comprises isolating a selected portion of one wall of said envelope; applying a vacuum to said isolated portion to cause the air entrained within said envelope to expand said isolated portion and rupture the same; and continuing to apply a vacuum to said isolated portion to evacuate air from within said envelope through said rupture to cause the ambient air pressure to collapse said envelope and force said film and screen into intimate face-to-face contact.

2. An apparatus for conditioning for exposure a film pack comprising a sheet of sensitive film and an intensifying screen enclosed in face-to-face relation within a substantially air-tight, flexible envelope containing entrained air and comprising a cup-shaped member the rim of which is adapted to be engaged with a portion of the wall of said envelope to isolate that portion of the envelope wall from ambient air pressure; a perforating member mounted within said cup-shaped member with its perforating tip disposed slightly above the plane of the rim of said cup-shaped member so as to be spaced from that portion of the wall of said envelope embraced by the rim of said cup-shaped member; and means for removing air from within said cup-shaped member while its rim is in contact with said wall to first cause the air entrained in said envelope to force the wall of said envelope against said perforating member to perforate the same, and secondly to evacuate air from said envelope through the perforation in the wall made by said perforating member and cause the ambient air pressure to collapse said envelope and force said film and screen into intimate face-to-face contact.

3. An apparatus for conditioning a film pack for exposure according to claim 2, and in which said cup-shaped member includes a vent which can be selectively opened to release the vaccum within said cup-shaped member to allow said cup-shaped member to be readily disengaged from the wall of said envelope.

4. An apparatus for conditioning for exposure a film pack comprising a sheet of sensitive film and an intensifying screen enclosed in face-to-face relation within a substantially air-tight, flexible envelope and comprising a cup-shaped member the rim of which is adapted to be engaged with a portion of the wall of said envelope to isolate that portion of the envelope wall from ambient air pressure; a perforating member mounted within said cup-shaped member to selectively move between an inoperative position, wherein it is spaced from that portion of the wall of said envelope embraced by the rim of said cup-shaped member, and an operative position, wherein it perforates said portion of said wall; and means for removing air from within said cup-shaped member while its rim is in contact with said wall to evacuate air from said envelope through a perforation in the wall made by said perforating member and cause the ambient air pressure to collepase said envelope and force said film and screen into intimate face-to-face contact.

5. An apparatus for conditioning a film pack for exposure according to claim 4, in which said cup-shaped member has its rim resiliently connected to the body of said member to permit said body portion to be moved axially relative to said rim after the rim is engaged with the wall of said envelope from a normal inoperative position, wherein said body portion is spaced a given distance from said rim, and an operative position, wherein said body portion is moved axially of said cup-shaped member and closer to said rim; and said perforating member comprises a rigid member fixed to said body portion and is of such length as to terminate short of the plane of said rim when said body portion is in its normal inoperative position and be moved beyond the plane of said rim when said body portion is moved to its operative position and perforate the wall of said envelope which said rim engages.

6. An apparatus for conditioning a film pack for exposure according to claim 4 in which said last-mentioned means for removing air from said cup-shaped member includes a vacuum channel leading from the inside of said cup-shaped member to the exterior thereof for connection to a source of vacuum, and a movable valve in said vacuum channel to selectively connect the interior of said cup to said source of vacuum to remove air from the same and to selectively seal the same off from said source of vacuum.

References Cited
UNITED STATES PATENTS

| | | | |
|---|---|---|---|
| 1,970,194 | 8/1934 | Riebel | 206—46 |
| 2,371,843 | 3/1945 | Powers | 250—68 |
| 3,291,984 | 12/1966 | Wasser | 250—68 |

FOREIGN PATENTS

| | | |
|---|---|---|
| 25,328 | 11/1912 | Great Britain. |

RALPH G. NILSON, *Primary Examiner.*

A. L. BIRCH, *Assistant Examiner.*